United States Patent
Gaubil et al.

(10) Patent No.: US 9,302,943 B2
(45) Date of Patent: Apr. 5, 2016

(54) REFRACTORY PRODUCT HAVING A HIGH CONTENT OF ZIRCONIA

(71) Applicant: Saint-Gobain Centre De Recherches Et D'Etudes Europeen, Chourbevoie (FR)

(72) Inventors: Michel Gaubil, Les Angles (FR); Ludovic Massard, Monteux (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 1 day.

(21) Appl. No.: 14/366,692

(22) PCT Filed: Dec. 19, 2012

(86) PCT No.: PCT/IB2012/057485
§ 371 (c)(1),
(2) Date: Jun. 19, 2014

(87) PCT Pub. No.: WO2013/093804
PCT Pub. Date: Jun. 27, 2013

(65) Prior Publication Data
US 2015/0007614 A1 Jan. 8, 2015

(30) Foreign Application Priority Data
Dec. 21, 2011 (FR) ..................... 11 62149

(51) Int. Cl.
*C04B 35/484* (2006.01)
*C03B 5/43* (2006.01)
*C04B 35/49* (2006.01)

(52) U.S. Cl.
CPC . *C04B 35/49* (2013.01); *C03B 5/43* (2013.01); *C04B 35/484* (2013.01); *C04B 2235/3201* (2013.01); *C04B 2235/3208* (2013.01); *C04B 2235/3217* (2013.01); *C04B 2235/3225* (2013.01); *C04B 2235/3409* (2013.01); *C04B 2235/3418* (2013.01)

(58) Field of Classification Search
CPC .................. C04B 35/484; C03B 5/43
See application file for complete search history.

(56) References Cited

U.S. PATENT DOCUMENTS

| | | | |
|---|---|---|---|
| 5,177,040 A | 1/1993 | Masahiro | |
| 5,466,643 A | 11/1995 | Ishino et al. | |
| 5,679,612 A | 10/1997 | Endo et al. | |
| 7,129,192 B2 * | 10/2006 | Boussant-Roux | C03B 5/43 501/104 |
| 8,124,554 B2 | 2/2012 | Boussant-Roux et al. | |
| 8,563,453 B2 * | 10/2013 | Tomura | C03B 5/43 501/104 |
| 8,765,620 B2 * | 7/2014 | Gaubil | C03B 5/43 501/105 |
| 8,822,362 B2 * | 9/2014 | Cabodi | C03B 5/43 501/105 |
| 2009/0038936 A1 | 2/2009 | Yves | |
| 2012/0295785 A1 | 11/2012 | Gaubil et al. | |

FOREIGN PATENT DOCUMENTS

| | | |
|---|---|---|
| EP | 0460959 A2 | 12/1991 |
| FR | 2701022 A1 | 1/1994 |
| FR | 2723583 A1 | 2/1996 |
| FR | 2836682 A1 | 3/2002 |
| FR | 2913013 A1 | 8/2008 |
| FR | 2953825 A1 | 6/2011 |
| JP | H04042813 A | 6/1990 |
| JP | H08119731 | 5/1996 |
| JP | 2009527454 A | 7/2009 |
| WO | 03074445 A1 | 9/2003 |

OTHER PUBLICATIONS

International Search Report dated Jun. 3, 2013.
French Search Report dated May 23, 2012.
Japanese OA in application JP 2014-548302 dated Jun. 24, 2015.
English Translation of OA in application JP 2014-548302 dated Jun. 24, 2015.

* cited by examiner

*Primary Examiner* — Karl Group
(74) *Attorney, Agent, or Firm* — Cooper Legal Group, LLC

(57) ABSTRACT

Fused cast refractory product comprising in percentages by weight on the basis of the oxides and for a total of 100%, —$ZrO_2$; balance to 100%, —$HfO_2$: <5% $SiO_2$: 2% to 10%; —$Y_2O_3$: 0.4% to 2.0%; —CaO: 4.0% to 8.0%; —$B_2O_3$+$Na_2O$+$K_2O$: 0.4% to 3.0% —$Al_2O_3$: 0.3% to 2.0%; —$P_2O_5$: <0.05%; —$Fe_2O_3$+$TiO_2$: <0.55%; —other species: <1.5%. Application in glass melting furnaces.

15 Claims, No Drawings

REFRACTORY PRODUCT HAVING A HIGH CONTENT OF ZIRCONIA

TECHNICAL FIELD

The invention relates to a novel fused and cast refractory product with a high content of zirconia.

PRIOR ART

Among refractory products, fused and cast products are distinguished, which are well known for the construction of glass melting furnaces and sintered products.

Unlike sintered products, fused and cast products usually comprise an intergranular vitreous phase linking crystalline grains. The problems posed by sintered products and by fused and cast products, and the technical solutions adopted for solving them, are therefore generally different. A composition developed for manufacturing a sintered product is therefore, in principle, not useable as such for manufacturing a fused and cast product, and vice versa.

Fused and cast products, often known as electrocasts, are obtained by melting a mixture of suitable raw materials in an electric arc furnace or via any other technique that is suited to these products. The molten material is then cast in a mold and the product obtained then undergoes a cycle of controlled cooling in order to be brought to room temperature without fracturing. This operation is known by those skilled in the art as "annealing".

Among fused and cast products, electrocast products with a high content of zirconia are reputed for their very high corrosion resistance without coloring the glass produced and without generating defects.

Conventionally, fused and cast products with a high content of zirconia also comprise sodium oxide ($Na_2O$) to avoid the formation of zircon from the zirconia and silica present in the product. The formation of zircon is harmful since it is accompanied by a decrease in volume of about 20%, thus creating mechanical stresses that are the cause of cracks.

FR 2 701 022 describes fused and cast products with a high content of zirconia, which contain 7.0% to 11.2% by weight of $SiO_2$, 0.05% to 1.0% by weight of $P_2O_5$, 0.05% to 1.0% by weight of boron oxide $B_2O_3$ and 0.01% to 0.12% by weight of $Na_2O+K_2O$.

FR 2 723 583 describes fused and cast products with a high content of zirconia which contain 3% to 8% by weight of $SiO_2$, 0.1% to 2.0% by weight of $Al_2O_3$, 0.05% to 3.0% by weight of boron oxide $B_2O_3$, 0.05% to 3% by weight of $BaO+SrO+MgO$ and 0.05% to 0.6% by weight of $Na_2O+K_2O$ and less than 0.3% by weight of $Fe_2O_3+TiO_2$.

FR 2 836 682 describes fused and cast products with a high content of zirconia which contain 2% to 8% by weight of $SiO_2$, 0.2% to 2.0% by weight of $Al_2O_3$, 0.12% to 1.0% by weight of $Na_2O$ and 0.5% to 2.6% by weight of $Y_2O_3+CaO$.

FR 2 953 825 describes fused and cast products with a high content of zirconia which contain 2% to 10% by weight of $SiO_2$, 0.3% to 2.0% by weight of $Al_2O_3$, less than 0.5% by weight of $Na_2O$, 0.01% to 4.5% by weight of $B_2O_3$ and 0.8% to 4.0% by weight of $Y_2O_3+CeO_2+CaO+MgO$.

The product ER-1195 manufactured and sold by the company Société Européenne des Produits Réfractaires and covered by patent EP-B-403 387 is today widely used in glass melting furnaces. Its chemical composition comprises about 94% zirconia, 4% to 5% silica, about 1% alumina, 0.3% sodium oxide and less than 0.05% by weight of $P_2O_5$. It is typical of products with a high content of zirconia used for glass furnaces.

These products give good performance, but there is an ongoing need for a fused product with a high content of zirconia that has good feasibility and high longevity, especially when it is used in a glassmaking furnace.

The present invention is directed toward satisfying this need.

SUMMARY OF THE INVENTION

The invention proposes a fused and cast refractory product comprising, as mass percentages on the basis of the oxides and for a total of 100%:

| | |
|---|---|
| $ZrO_2$: | remainder to 100% |
| $HfO_2$: | <5% |
| $SiO_2$: | 2% to 10% |
| $Y_2O_3$: | 0.4% to 2.0% |
| $CaO$: | 4.0% to 8.0% |
| $B_2O_3 + Na_2O + K_2O$: | 0.4% to 3.0%, or even 0.5% to 3.0%, |
| $Al_2O_3$: | 0.3% to 2.0% |
| $P_2O_5$: | <0.05% |
| $Fe_2O_3 + TiO_2$: | <0.55% |
| other species: | <1.5%. |

Zirconia exists in three crystallographic forms. In the absence of dopant, zirconia is in the monoclinic form up to 1150° C., in the stable tetragonal form between 1150° C. and 2370° C., and in the cubic form at and above 2370° C.

During the annealing of a furnace whose walls comprise blocks of refractory product with a high content of zirconia, the transformation from the monoclinic phase to the tetragonal phase is accompanied by a decrease in volume of the joints by reversible thermal expansion of about 4.5%. If the increase in volume at the operating temperature of the furnace is not as large as the decrease due to the phase change, then the joints between two consecutive blocks, in the absence of mechanical pressure, remain open.

Moreover, a block of a glassmaking furnace vessel is often in service at a temperature that decreases from its face in contact with the molten glass ("hot face") to its face exposed to the exterior of the vessel ("cold face"). Now, a product with a high content of zirconia conventionally has a maximum expansion temperature that is between the temperatures of these two faces. Two adjacent blocks are thus assembled so as to always remain in contact at least in the region where they are subjected to this maximum expansion temperature. This thus ensures that at least in this critical region they can ensure leaktightness of the vessel. It is important to limit the corrosion in this critical region.

Now, corrosion by molten glass generally increases with its temperature. The inventors thus imagined that it might be advantageous to seek to reduce the maximum expansion temperature of the material of the blocks so as to shift said critical region toward the cold face of the blocks. Thus, this critical region may be in contact with more viscous and less corrosive molten glass than in the case of the prior art.

As will be seen in greater detail in the rest of the description, by virtue of their investigations, the inventors have discovered that a product of the present invention has noteworthy dilatometric behavior, and in particular a reduced maximum expansion temperature, and thus ensures total closure of the joints. In addition, this product conserves high industrial feasibility.

A product according to the invention may also comprise one or more of the following optional characteristics, including when it is in accordance with the particular embodiments described below and when these optional characteristics are not incompatible with said particular embodiments:

the total porosity of the product is less than 10%, or even less than 5%;

preferably, the oxides represent more than 90%, more than 95%, more than 99%, or even substantially 100% of the mass of the product;

the mass content of $ZrO_2+HfO_2$ is less than 92.0%, or even less than 90.0%, or even less than 89.0% and/or greater than 83.0%, or even greater than 84.0%, or greater than 85.0%;

the mass content of silica $SiO_2$ is greater than 2.5%, or even greater than 3.0% and/or less than 9.0%, or even less than 8.0%, or even less than 7.0%, or even less than 6.0%;

the mass content of $Y_2O_3$ is greater than 0.5%, or even greater than 0.7%, or even greater than 0.9%, or even greater than 1.0%, or even greater than 1.1%, and/or less than 1.9%, or even less than 1.8%, or even less than 1.7%, or even less than 1.6%;

the mass content of CaO is greater than 4.2%, or even greater than 4.4%, or even greater than 4.6% and/or less than 7.5%, or even less than 7.2%, or even less than 6.8%, or even less than 6.5%;

The sum of the mass contents of boron oxide $B_2O_3$, sodium oxide $Na_2O$ and potassium oxide $K_2O$ is greater than 0.6%, or even greater than 0.7%, or even greater than 0.8%, or even greater than 0.9% and/or less than 2.8%, less than 2.5%, less than 2.2%, or even less than 2.0%, or even less than 1.8%, or even less than 1.6%;

the mass content of boron oxide $B_2O_3$ is greater than 0.6%, or even greater than 0.7%, or even greater than 0.8%, or even greater than 0.9% and/or less than 2.8%, less than 2.5%, less than 2.2%, or even less than 2.0%, or even less than 1.8%, or even less than 1.6%;

preferably, $B_2O_3 \geq CaO/SiO_2$;

the sum of the mass contents of sodium oxide $Na_2O$ and potassium oxide $K_2O$ is less than 1.5%, or even less than 1.0%, or even less than 0.8%, or even less than 0.6%, or even less than 0.4%, or even less than 0.3%, less than 0.2%;

sodium oxide $Na_2O$ is present only as impurity and its mass content is less than 0.2%, or even less than 0.1%;

potassium oxide $K_2O$ is present only as impurity and its mass content is less than 0.2%, or even less than 0.1%;

the mass content of alumina $Al_2O_3$ is less than 1.5%, or even less than 1.2%, or less than 1.1%;

the mass content of alumina $Al_2O_3$ is greater than 0.4%, greater than 0.6%, or even greater than 0.7%, greater than 0.8% or greater than 0.9%;

the mass content of iron oxide and/or titanium oxide, $Fe_2O_3+TiO_2$, is less than 0.4%, preferably less than 0.3%, preferably less than 0.2%;

the total mass content of the "other species" is less than 1.0%, less than 0.6%, less than 0.5%, or even less than 0.3%;

the "other species" consist only of impurities;

the mass content of any "other species" is less than 0.4%, or even less than 0.3%, or even less than 0.2%.

According to a particular embodiment, the invention proposes a fused and cast refractory product comprising, as mass percentages on the basis of the oxides:

| | |
|---|---|
| $SiO_2$: | 3% to 8% |
| $Y_2O_3$: | 1.0% to 2% |
| CaO: | 4.5% to 7.0% |
| $B_2O_3$: | 0.7% to 2.5% |
| $Na_2O$: | <0.5% |
| $Al_2O_3$: | <1.5%. |

According to a particular embodiment, the invention proposes a fused and cast refractory product comprising, as mass percentages on the basis of the oxides:

| | |
|---|---|
| $SiO_2$: | 3% to 6% |
| $Y_2O_3$: | 1.0% to 2% |
| CaO: | 4.5% to 6.5% |
| $B_2O_3$: | 0.8% to 2.0% |
| $Na_2O$: | <0.5% |
| $Al_2O_3$: | <1.2%. |

The invention also relates to a process for manufacturing a refractory product according to the invention, comprising the following successive steps:

a) mixing raw materials so as to form a starting feedstock, b) melting said starting feedstock until a molten material is obtained, c) casting and solidifying said molten material, by cooling, so as to obtain a refractory product, this process being noteworthy in that said raw materials are chosen such that said refractory product is in accordance with the invention.

Preferably, the oxides for which a minimum content is necessary or precursors of these oxides are systematically and methodically added. Preferably, the contents of these oxides in the sources of the other oxides in which they are present as impurities are taken into account.

Preferably, the cooling is controlled, preferably so as to be performed at a rate of less than 20° C. per hour and preferably at a rate of about 10° C. per hour.

The invention also relates to a glass melting furnace comprising a refractory product according to the invention, or a refractory product that is manufactured or that may have been manufactured according to a process according to the invention, in particular in a region that is in contact or intended to be in contact with molten glass. In a furnace according to the invention, the refractory product may advantageously form part of a vessel for preparing glass by melting, especially electrical melting, where it is liable to come into contact with molten glass at a temperature above 1200° C.

DEFINITIONS

The mass percentages of oxides refer to the overall contents for each of the corresponding chemical elements, expressed in the form of the most stable oxide, according to the usual convention in the industry.

A "molten material" is a liquid mass which, to conserve its form, must be contained in a container. It may contain a few solid particles, but in an amount insufficient for them to be able to structure said mass.

The term "impurities" means the inevitable constituents, unintentionally and necessarily introduced with the raw materials or resulting from reactions with these constituents. Impurities are not necessary constituents, but merely tolerated. For example, the compounds forming part of the group of oxides, nitrides, oxynitrides, carbides, oxycarbides, carbonitrides and metallic species of iron, titanium and chromium are impurities.

Unless otherwise mentioned, all the amounts of oxides in the described and claimed products are mass percentages on the basis of the oxides.

DETAILED DESCRIPTION OF THE INVENTION

In the fused and cast products according to the invention, the high content of zirconia $ZrO_2$ makes it possible to satisfy the high corrosion resistance requirements without coloring the glass produced or generating defects detrimental to the quality of this glass.

Hafnium oxide, $HfO_2$, present in the product according to the invention is hafnium oxide naturally present in sources of zirconia. Its content in a product according to the invention is thus less than 5% and generally less than 2%.

The presence of silica $SiO_2$ especially allows the formation of an intergranular vitreous phase that is capable of efficiently accommodating the variations in volume of zirconia during its reversible allotropic transformation, i.e. during passage from the monoclinic phase to the tetragonal phase. The mass content of silica should be greater than 2%. On the other hand, the addition of silica should not exceed 10% since this addition takes place to the detriment of the zirconia content and may therefore impair the corrosion resistance.

The presence of $B_2O_3$ makes it possible especially to improve the feasibility of the products. On the other hand, the addition of boron oxide should remain limited since this addition takes place to the detriment of the zirconia content and may thus impair the corrosion resistance.

The presence of alumina $Al_2O_3$ is especially useful for the formation of a stable vitreous phase and for good flowability of the molten material in the mold. However, the addition of alumina should not exceed 2.0% since a higher mass content may bring about instability of the vitreous phase (formation of mullite crystals), in particular due to the presence of boron oxide.

The mass content of $Na_2O+K_2O$ is preferably less than 0.50% so as to limit the flying-off of the raw materials, in particular of the boron oxide. In a product according to the invention, it is considered that the oxides $Na_2O$ and $K_2O$ have similar effects.

According to the invention, the mass content of $Fe_2O_3+TiO_2$ is less than 0.55% and that of $P_2O_5$ is less than 0.05%. Specifically, these oxides are harmful and their content should be limited to traces introduced as impurities with the raw materials.

The "other species" are oxide species that are not listed above, namely species other than $ZrO_2$, $HfO_2$, $SiO_2$, $Y_2O_3$, $CaO$, $B_2O_3$, $Al_2O_3$, $Na_2O$, $K_2O$, $P_2O_5$, $TiO_2$, and $Fe_2O_3$. In one embodiment, the "other species" are limited to species whose presence is not particularly desired and which are generally present as impurities in the raw materials.

In another embodiment, the "other species" may also comprise species whose presence is advantageous. Thus, in one embodiment, the product advantageously comprises at least 0.05% barium oxide BaO. This oxide may be an impurity or may be deliberately added to the starting feedstock, if necessary. Preferably, its content is less than 0.5%, as a mass percentage on the basis of the oxides.

The maximum expansion temperature of a product according to the invention is preferably less than 900° C., less than 850° C., or even less than 800° C.

A product according to the invention may be conventionally manufactured according to steps a) to c) described below:
 a) mixing raw materials so as to form a starting feedstock,
 b) melting said starting feedstock until a molten material is obtained,
 c) solidifying said molten material, by cooling, so as to obtain a refractory product according to the invention.

In step a), the raw materials are chosen so as to ensure the contents of oxides in the finished product.

In step b), the melting is preferably performed by means of the combined action of a fairly long electric arc, which does not produce reduction, and of blending promoting the reoxidation of the products.

To minimize the formation of nodules of metallic appearance and to avoid the formation of slits or cracks in the final product, it is preferable to perform the melting under oxidizing conditions.

Preferentially, the long arc melting process described in French patent No. 1 208 577 and its additions Nos. 75893 and 82310 is used.

This process consists in using an electric arc furnace whose arc surges from between the feedstock and at least one electrode separate from this feedstock and in adjusting the length of the arc so that its reducing action is minimized, while at the same time maintaining an oxidizing atmosphere above the molten bath and by blending said bath, either by the action of the arc itself, or by sparging into the bath an oxidizing gas (for example air or oxygen) or alternatively by adding to the bath substances that give off oxygen such as peroxides or nitrates.

In step c), the cooling is preferably performed at a rate of less than 20° C. per hour, preferably at a rate of about 10° C. per hour.

Any conventional process for manufacturing fused products based on zirconia intended for uses in glass melting furnaces may be used, provided that the composition of the starting feedstock makes it possible to obtain products having a composition in accordance with that of a product according to the invention.

EXAMPLES

The nonlimiting examples that follow are given for the purpose of illustrating the invention.

In these examples, the following raw materials were used:
 zirconia mainly containing, as mean amounts by mass, 98.5% $ZrO_2+HfO_2$, 0.2% $SiO_2$ and 0.02% $Na_2O$,
 zircon sand containing 33% silica,
 yttrium and boron oxides with a purity of greater than 99%,
 calcium oxide in the form of quicklime comprising about 98% CaO,
 alumina of AC44 type sold by the company Pechiney and containing on average 99.4% alumina $Al_2O_3$.

The products were prepared according to the standard process of melting in an arc furnace, and then cast to obtain blocks of 220 mm×450 mm×150 mm format.

The chemical analysis of the products obtained is given in Table 1; this is a mean chemical analysis, given as mass percentages.

Feasibility

For each of these examples, the feasibility of the product is evaluated by means of a feasibility index IF. An IF value equal to 2 corresponds to excellent feasibility (optimum manufacturing yield, no defects on the pieces obtained), an IF value equal to 1 corresponds to acceptable feasibility for industrial manufacture (a few non-traversing fissures), an IF value equal to 0 corresponds to unacceptable feasibility for industrial manufacture (traversing fissures, split pieces, etc.).

Filling Index

The various examples of blocks produced are then cut into two to allow observation of the internal zone and evaluation of the filling of the block. The quality is evaluated by means of a filling index FI. An FI value equal to 2 corresponds to excellent filling which ensures good corrosion resistance even in the case of wear of the outer zone, an FI value equal to 1 corresponds to acceptable filling, and an FI value equal to 0 corresponds to incomplete filling.

On the various examples of blocks produced, samples were taken to perform tests.

Measurement of the Maximum Expansion Temperature before Phase Change

The expansion curve is established as a function of the temperature and the temperature corresponding to the maximum expansion, before the transformation (monoclinic to quadratic) of the zirconia, noted "T" and given in ° C. in Table 1, is noted. "N" indicates that there is not transformation of the zirconia.

The dimension D of the sample at 1500° C. is also compared with its initial dimension $D_0$ (the maximum expansion position (before transformation of the zirconia), and the variation $(D-D_0)/D$ noted "D1500" in table 1 is calculated). A positive value indicates that the joints are not closed.

Example 1 corresponds to the product ER1195 which constitutes the reference.

The remainder corresponds to the content of $ZrO_2+HfO_2$ and also to the impurities (whose content is always less than 0.5% in these examples).

TABLE 1

| Ex. | $SiO_2$ | $Al_2O_3$ | $Y_2O_3$ | CaO | $Na_2O$ | $B_2O_3$ | $CaO/SiO_2$ | IF | FI | T | D1500 |
|---|---|---|---|---|---|---|---|---|---|---|---|
| 1* | 4.50 | 1.20 | 0.00 | 0.00 | 0.30 | 0.00 | 0.00 | 2 | 2 | 1130 | 0.60 |
| 2* | 4.50 | 1.10 | 0.88 | 0.00 | 0.40 | 0.00 | 0.00 | 2 | 2 | 1070 | 0.78 |
| 3* | 4.50 | 1.10 | 1.42 | 0.00 | 0.00 | 0.40 | 0.00 | 2 | 2 | 920 | 0.30 |
| 4* | 4.74 | 1.06 | 7.14 | 0.00 | 0.76 | 0.00 | 0.00 | 0 | 0 | N | −1.54 |
| 5* | 6.38 | 0.98 | 6.64 | 0.30 | 0.00 | 0.74 | 0.05 | 0 | 2 | N | −1.14 |
| 6* | 5.34 | 1.09 | 0.11 | 5.17 | 0.00 | 0.70 | 0.97 | 1 | 2 | 970 | 0.20 |
| 7* | 4.78 | 0.89 | 1.59 | 3.16 | 0.70 | 0.00 | 0.66 | 1 | 0 | 870 | 0.44 |
| 8 | 4.69 | 0.85 | 0.99 | 6.67 | 0.42 | 0.00 | 1.42 | 1 | 0 | 680 | −0.49 |
| 9 | 5.33 | 1.05 | 1.67 | 5.14 | 0.00 | 0.47 | 0.96 | 1 | 1 | 770 | −0.05 |
| 10 | 6.06 | 0.84 | 1.55 | 5.79 | 0.84 | 0.00 | 0.96 | 2 | 0 | N | −1.54 |
| 11 | 6.44 | 1.07 | 1.26 | 4.46 | 0.72 | 0.00 | 0.69 | 2 | 0 | 830 | −0.63 |
| 12 | 4.26 | 0.82 | 1.49 | 6.50 | 0.00 | 0.88 | 1.53 | 2 | 1 | 560 | −0.67 |
| 13 | 4.89 | 1.30 | 1.61 | 7.74 | 0.00 | 0.83 | 1.58 | 2 | 0 | N | −1.30 |
| 14 | 4.63 | 1.04 | 1.66 | 4.88 | 0.00 | 1.40 | 1.05 | 2 | 2 | 740 | −0.16 |
| 15 | 4.55 | 0.98 | 1.65 | 4.83 | 0.00 | 1.54 | 1.06 | 2 | 2 | 780 | −0.03 |
| 16 | 4.62 | 0.93 | 1.68 | 4.80 | 0.00 | 1.43 | 1.04 | 2 | 2 | 770 | −0.01 |
| 17 | 3.97 | 1.03 | 1.96 | 4.07 | 0.00 | 0.50 | 1.03 | 2 | 1 | 680 | −0.19 |
| 18 | 4.87 | 1.19 | 0.43 | 6.57 | 0.00 | 1.06 | 1.35 | 2 | 2 | 772 | −0.25 |
| 19 | 4.8 | 1.14 | 0.47 | 7.52 | 0.00 | 0.93 | 1.57 | 2 | 2 | 772 | −0.28 |
| 20 | 4.76 | 0.99 | 0.43 | 6.66 | 0.00 | 1.05 | 1.40 | 2 | 2 | 760 | −0.17 |

*outside the invention

Examples 2 and 3 show that yttrium oxide alone, at contents of less than 2%, does not make it possible to close the joints.

Examples 4 and 5 show that yttrium oxide alone, at contents of 6% to 8%, makes it possible to close the joints and to totally stabilize the zirconia (no more transformation). However, the feasibility of such products degrades and makes such compositions unusable for producing very large industrial blocks.

Example 6 shows the detrimental effect on the closure of the joints of an insufficient content of $Y_2O_3$.

A comparison of Example 7 with Examples 10 or 12 shows the importance of the presence of a minimum amount of calcium oxide for obtaining closure of the joints.

Examples 8 and 9 show products that allow closure of the joints while at the same time having acceptable feasibility, but a comparison with Examples 10 to 20 shows the advantage of the presence of a minimum amount of boron oxide and/or sodium oxide for obtaining excellent feasibility in the presence of yttrium oxide and calcium oxide.

Examples 10 to 20 show that the simultaneous presence of yttrium oxide and calcium oxide according to the invention makes it possible to close the joints while at the same time maintaining excellent feasibility. A significant lowering of the maximum expansion temperature before phase change is also observed. Thus, it advantageously becomes possible to reduce the temperature of the molten glass in contact with the critical region and thus the corrosion to which it gives rise.

Examples 10 and 11 show the value of adding $B_2O_3$ to improve the filling.

The examples also show the positive role of boron oxide for optimizing the filling, especially at contents of greater than 0.9% or even greater than 1.0%, or even when this content becomes higher than the ratio of the contents of calcium oxide and of silica.

Moreover, other tests made it possible to confirm that the products according to the invention also have the other properties acknowledged for materials with a high content of zirconia, in particular resistance to corrosion by the molten glass.

Needless to say, the present invention is not limited to the embodiments described and represented, which are given as nonlimiting illustrative examples.

The invention claimed is:

1. A fused and cast refractory product comprising, as mass percentages on the basis of the oxides and for a total of 100%:

| | |
|---|---|
| $ZrO_2$: | remainder to 100% |
| $HfO_2$: | <5% |
| $SiO_2$: | 2% to 10% |
| $Y_2O_3$: | 0.4% to 2.0% |
| CaO: | 4.0% to 8.0% |
| $B_2O_3 + Na_2O + K_2O$: | 0.4% to 3.0% |
| $Al_2O_3$: | 0.3% to 2.0% |
| $P_2O_5$: | <0.05% |
| $Fe_2O_3 + TiO_2$: | <0.55% |
| other species: | <1.5%. |

2. The product as claimed in claim 1, in which $(Na_2O+K_2O)<0.5\%$.

3. The product as claimed in claim 1, in which the content of yttrium oxide $Y_2O_3$ is greater than or equal to 0.7%.

4. The product as claimed in claim 3, in which the content of yttrium oxide $Y_2O_3$ is greater than or equal to 1.0%.

5. The product as claimed in claim 1, in which the content of calcium oxide CaO is greater than 4.5%.

6. The product as claimed in claim 1, in which the content of calcium oxide CaO is less than 7.0%.

7. The product as claimed in claim 6, in which the content of calcium oxide CaO is less than 6.5%.

8. The product as claimed in claim 1, in which the content of boron oxide $B_2O_3$ is greater than 0.7%.

9. The product as claimed in claim 1, in which the content of boron oxide is less than 2.5%.

10. The product as claimed in claim 9, in which the content of boron oxide $B_2O_3$ is less than 2.0%.

11. The product as claimed in claim 1, in which the content of silica $SiO_2$ is less than 8.0%.

12. The product as claimed in claim 11 in which the content of silica $SiO_2$ is less than 6.0%.

13. The product as claimed in claim 1, in which the content of boron oxide is such that $B_2O_3 \geq CaO/SiO_2$.

14. The product as claimed in claim 1, in which the content of alumina $Al_2O_3$ is less than 1.5%.

15. A glass melting furnace comprising, in a region intended to be in contact with the molten glass, a refractory product as claimed in claim 1.

* * * * *